United States Patent
Appukutty et al.

(10) Patent No.: US 8,910,986 B1
(45) Date of Patent: Dec. 16, 2014

(54) BONDED AND ROTATABLE VEHICLE SENSOR ASSEMBLY

(71) Applicant: Ford Global Technologies, LLC, Dearborn, MI (US)

(72) Inventors: Jayagopal Appukutty, Troy, MI (US); Steven Yellin Schondorf, Dearborn, MI (US); Erich Kemnitz, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/047,153

(22) Filed: Oct. 7, 2013

Related U.S. Application Data

(63) Continuation-in-part of application No. 13/916,118, filed on Jun. 12, 2013.

(51) Int. Cl.
*B60R 19/48* (2006.01)
*B60R 21/0136* (2006.01)

(52) U.S. Cl.
CPC ........... *B60R 19/483* (2013.01); *B60R 21/0136* (2013.01)
USPC ..................... 296/1.04; 296/187.03; 293/117; 342/27; 342/70

(58) Field of Classification Search
CPC ...... B60R 19/02; B60R 19/023; B60R 19/48; B60R 19/483; B60R 21/013; B60R 21/0134; B60R 21/34
USPC ............ 293/117, 120, 121; 296/1.04, 187.03, 296/187.04, 187.09; 342/27, 28, 70
See application file for complete search history.

(56) References Cited

U.S. PATENT DOCUMENTS

| | | | |
|---|---|---|---|
| 5,299,387 A | 4/1994 | Miller et al. | |
| 6,203,366 B1 | 3/2001 | Muller et al. | |
| 6,279,210 B1 * | 8/2001 | Faass et al. | 24/457 |
| 6,318,774 B1 * | 11/2001 | Karr et al. | 293/117 |
| 7,303,041 B2 * | 12/2007 | Stuve | 180/274 |
| 7,616,102 B2 | 11/2009 | Kudelko et al. | |
| 7,784,855 B2 | 8/2010 | Faass et al. | |
| 2006/0267359 A1 | 11/2006 | Blake | |
| 2011/0043344 A1 | 2/2011 | Nichols et al. | |
| 2013/0250732 A1 * | 9/2013 | Tsuji et al. | 367/173 |

FOREIGN PATENT DOCUMENTS

| | | |
|---|---|---|
| DE | 20010478 U1 | 10/2000 |
| DE | 20118265 U1 | 1/2002 |
| DE | 102010049818 A1 | 5/2012 |
| FR | 2809691 A1 | 12/2001 |
| FR | 2978400 A1 * | 2/2013 |
| JP | 2009514735 A | 4/2009 |
| WO | WO2013114466 A1 * | 8/2013 |

* cited by examiner

*Primary Examiner* — Glenn Dayoan
*Assistant Examiner* — Jason S Daniels
(74) *Attorney, Agent, or Firm* — Frank A. MacKenzie; Brooks Kushman P.C.

(57) ABSTRACT

An automotive vehicle fascia assembly is provided. The fascia assembly includes a bumper cover and an impact sensor assembly attached to, without mechanically fastening, the bumper cover. The sensor assembly includes a housing configured to selectively rotate from a first position to a second position, a sensor disposed within the housing, and a wall preventing access to the sensor when the housing is in the first position. The sensor is accessible when the housing is in the second position.

20 Claims, 8 Drawing Sheets

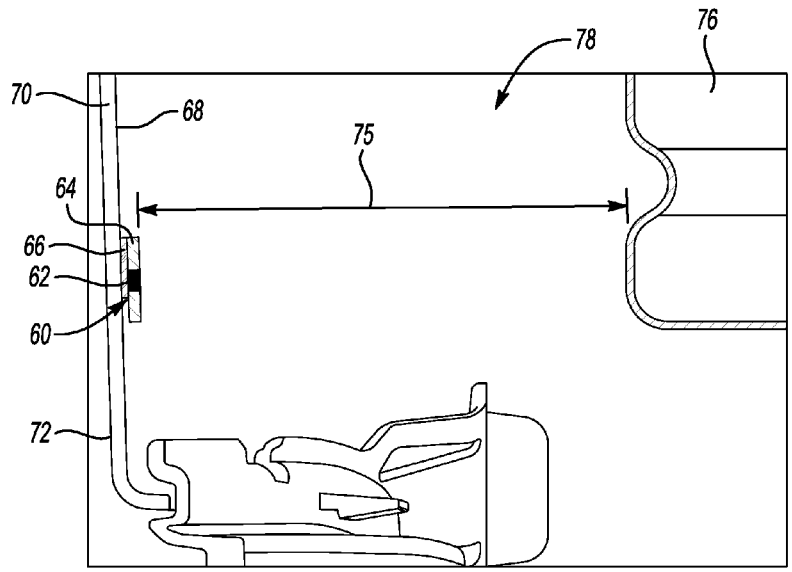
Fig-3
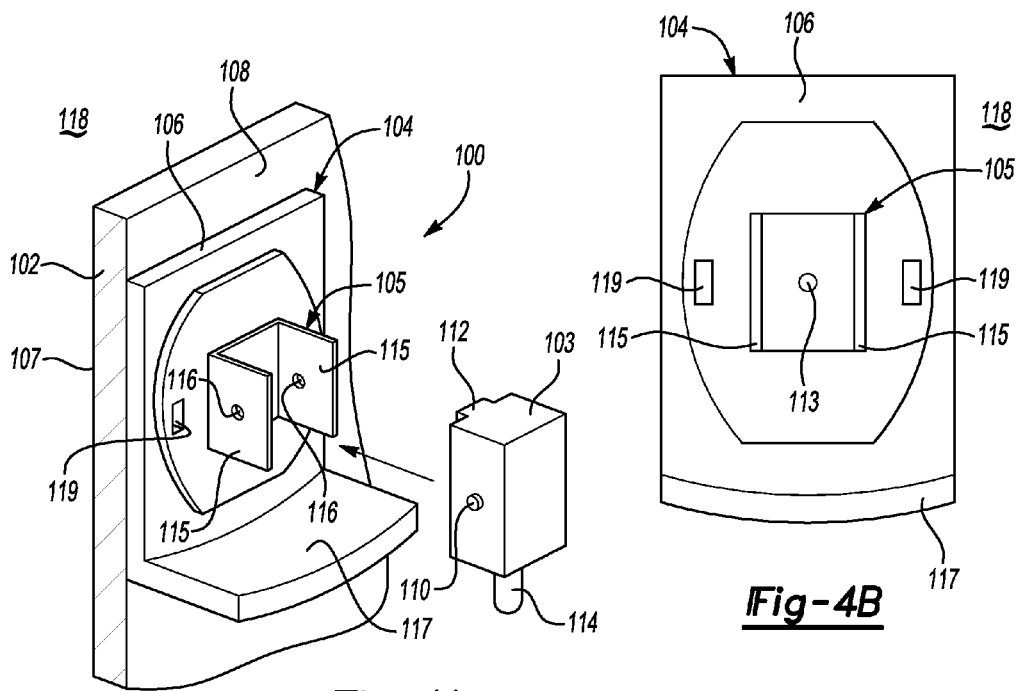
Fig-4A
Fig-4B

BONDED AND ROTATABLE VEHICLE SENSOR ASSEMBLY

CROSS-REFERENCE TO RELATED APPLICATION

This application is a continuation-in-part of application Ser. No. 13/916,118, filed Jun. 12, 2013, the disclosure of which is hereby incorporated in its entirety by reference herein.

TECHNICAL FIELD

This disclosure relates to the attachment of sensors to vehicle components.

BACKGROUND

Automotive vehicles use environment awareness to improve vehicle performance and vehicle safety features. Consumer appetites and automotive regulations may push demand for environment awareness improvements. Vehicle structures may operate with sensor systems to obtain information on a surrounding environment and direct corresponding vehicle responses. On-board vehicle systems may obtain different types of information from different locations on the vehicle. These vehicle systems may include sensors and sensor systems to assist in obtaining the information. A position and/or location of these sensors on-vehicle typically play a role in the operation of the sensor and sensor systems. Additionally, these sensor systems may be designed to facilitate efficient installation and/or assembly processes.

SUMMARY

A vehicle includes a bumper beam, a bumper cover having inner and outer surfaces and an impact sensor assembly attached to, without mechanically fastening, the inner surface. The sensor assembly includes a housing, an acceleration sensor disposed within the housing, and a planar tab ultrasonically welded to the inner surface. The planar tab has a thickness such that when ultrasonically welded to the inner surface, the planar tab does not cause deformation of the outer surface proximate to the planar tab. The housing is spaced away from the inner surface a distance no greater than the thickness of the planar tab and the assembly is arranged such that the distance between the bumper beam and the assembly is at least seventy millimeters. The housing may be configured to selectively rotate from a first position to a second position and include a wall to prevent mating access in the first position. The sensor may be accessible for mating in the second position. The sensor assembly may include a lock mechanism configured to hold the housing in the first position. Attaching the sensor to the housing may release the hold such that the housing may rotate to the second position. The sensor may include a lock tab configured to mate with a slot of the sensor assembly when the housing is in the second position. The sensor assembly may include a pin having a bias to selectively hold the housing in the first position until the sensor is attached. The planar tab may be made of a material that is the same as a material of the bumper cover. The planar tab may be between one and three millimeters thick.

A vehicle fascia assembly includes a bumper beam, a bumper cover having an inner surface and a sensor assembly disposed between the bumper beam and bumper cover. The sensor assembly includes a planar tab bonded to the inner surface, a housing configured to rotate from a first position to a second position, a sensor with a connector, and a wall proximate to the connector. The wall is configured to prevent mating access to the connector in the first position. In the second position the connector is accessible for mating. The vehicle fascia assembly may include a pin configured to bias the housing toward the bumper cover and selectively hold the housing in the first position until the sensor is attached to the housing. The sensor may include a lock tab to pull the housing away from the bumper cover when the sensor is installed onto the housing such that the housing and sensor may rotate to the second position. The sensor assembly may include a slot to mate with the lock tab when the housing is in the second position. The planar tab may be embedded within the housing and be between one and three millimeters thick.

A vehicle includes a bumper beam, a bumper cover having an inner surface, a sensor, a lock mechanism, and a wall. The bracket is disposed between the bumper beam and bumper cover and includes a base bonded to the inner surface and a housing configured to rotate from a first position to a second position. The sensor is configured to attach to the housing and includes a connector. The lock mechanism is configured to hold the bracket in the first position and to release the hold when the sensor attaches to the housing. The wall is proximate to the connector and configured to prevent mating access to the connector in the first position. In the second position, the connector clears the wall and is accessible for mating by another connector. The assembly may be arranged such that a minimum distance between the bumper beam and the assembly is at least seventy millimeters. The sensor may include a lock tab configured to mate with a slot of the bracket when the housing is in the second position. The bracket may include a pin having a bias to selectively hold the housing in the first position until the sensor is attached to the housing. The bracket may include a planar tab ultrasonically welded to the inner surface. The planar tab may be between one and three millimeters thick. The planar tab may be of a material that is the same as a material of the bumper cover.

A vehicle includes a bumper beam and a bumper cover including an inner surface. A bracket is disposed between the bumper beam and bumper cover. The bracket defines a base bonded to the inner surface and a key hole. A sensor includes a key, a connector and a clip, the key is configured to mate with the key hole, and the sensor is configured to selectively rotate between a first and second position. The clip is configured to prevent mating access to the connector when the sensor is in the first position but not in the second position. The clip may include an arm and a nub. The sensor may define an aperture. The nub may be configured to engage the aperture to orient the clip such that the arm is proximate to the connector and prevents mating access thereto. The nub may be further configured such that the nub disengages from the aperture in response to application of opposing rotational forces to the sensor and clip. The bracket may further define an arm slot. The arm may be configured to mate with the arm slot when the sensor is in the first and second positions. The bracket may further define a tab slot to receive a lock tab of the sensor configured to mate with the tab slot when the sensor is in the second position. The bracket may further define a planar tab ultrasonically welded to the inner surface. A thickness of the planar tab may be between one and three millimeters. A material of the planar tab may be the same material of the bumper cover

BRIEF DESCRIPTION OF THE DRAWINGS

FIG. 3 is a side view, in cross-section, of a sensor assembly attached to a bumper cover.

FIG. 4a is a perspective view of a bracket attached to a bumper cover and a sensor.

FIG. 4b is a front view of the bracket from FIG. 4a.

FIG. 4c is a side view of the bracket from FIG. 4a.

FIG. 4d is a side view of the sensor from FIG. 4a.

FIG. 5a is a perspective view of a first position of a sensor assembly including the bracket and sensor from FIG. 4a.

FIG. 5b is a side view of the bracket from FIG. 5a.

FIG. 6b is a side view, in cross-section, of the sensor assembly from FIG. 6a.

FIG. 8b is a side view of the sensor from FIG. 8a.

FIG. 8c is a perspective view of a clip of the sensor from FIG. 8a.

FIG. 10b is a front view of FIG. 10a.

DESCRIPTION

Figure 1:
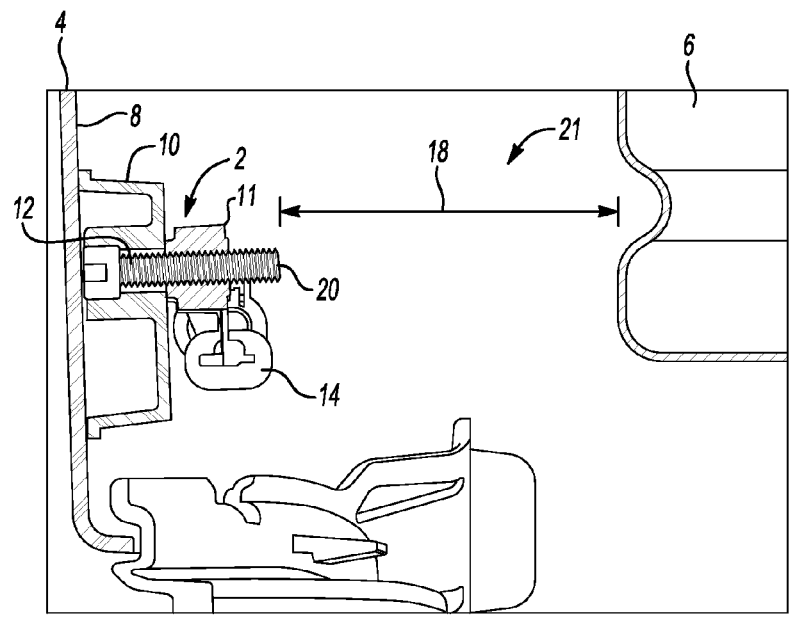
FIG. 1 is a side view, in cross-section, of a sensor assembly attached to a bumper cover via a stud, nut and bracket.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles include multiple safety features to assist in protecting vehicle occupants, the vehicle itself and surrounding objects. Structural safety features may be coupled with sensor systems to warn and/or alert a driver under certain circumstances, such as when the vehicle nears an object. One example of a sensor system is a vehicle parking aid system which may include a sensor to detect objects and a capability to sound an alert in response to object detection. As such, the parking aid system may alert the driver if, for example, the vehicle is nearing an object when backing into a parking space.

Another example of a sensor system is a pedestrian protection system to provide protection for pedestrians and/or to reduce pedestrian injury resulting from an impact with the vehicle. This type of sensor system may detect an object upon impact and activate a vehicle response. Certain sensors, such as impact sensors, may further determine the type of object impacting the vehicle and send a corresponding signal to a safety system to activate the vehicle response. The locations, positions and method of mounting these sensors often coincide with proximate vehicle structural features to provide desired performance.

For example, impact sensors may be positioned in an area between a vehicle's fascia and a vehicle's bumper beam. A bumper cover portion of the vehicle's fascia is one example of this type of area. Vehicle fascias typically include an A-surface and a B-surface. The A-surface and/or outer surface is a portion of the fascia facing "outward" and/or facing "off vehicle" (the surface typically seen by pedestrians and other motorists). The B-surface and/or inner surface is a portion of the fascia facing "inward" (the surface typically not seen by pedestrians and other motorists.) The B-surface of a bumper cover typically faces the bumper beam and/or an energy absorber. Current automotive applications for securing and/or positioning a sensor assembly at or near a fascia B-surface utilize a plastic assembly with a weld stud attached thereto. The plastic assembly is typically heat staked or welded to the B-surface. The sensor is then mechanically attached to the weld stud with a nut. The stud, however, is a hard point of contact extending toward the bumper beam which may be undesirable as described below.

Referring now to FIG. 1, an impact sensor assembly 2 is attached to a vehicle bumper cover 4 as known in the art. The sensor assembly 2 is mounted to a B-surface 8 of the bumper cover 4. The sensor assembly 2 includes a plastic bracket 10 with a stud 12 and a nut 11 to facilitate mounting an impact sensor 14 to the B-surface 8. Dimension 18 is a distance between an end 20 of the stud 12 and a bumper beam 6 within an area 21. The end 20 is an example of hard point of contact. Automotive safety standards may provide guidance on appropriate minimum distances between a hard point of contact and a bumper beam or a sensor assembly and the bumper beam, referred to herein as a crush distance. Automotive manufacturers may also have internal standards relating to the crush distance.

For example, an impact at or near the sensor assembly 2 on bumper cover 4 may direct the stud 12 and nut 11 toward the bumper beam 6. If the end 20 bottoms out against the bumper beam 6, the sensor 14 may cease operation due to damage and/or destruction. In terms of sensor performance, an impact where the crush distance is too small may render the sensor 14 inoperable prior to completion of its tasks. In contrast, a larger crush distance may provide more time for the sensor 14 to operate following an impact. Therefore, it may be desirable to minimize and/or eliminate elements of sensor assemblies within the area 21 to maximize the crush distance. For example, a horizontal dimension of the plastic bracket 10 may contribute to a shorter crush distance since the nut 11 and stud 12 are needed to mechanically fasten the sensor 14 to the bumper cover 4. Additional safety requirements, such as a preferred number of stud 12 threads clearing the nut 11, may also contribute to a shorter crush distance. Eliminating the plastic bracket 10, nut 11 and stud 12 may result in a larger crush distance and one less hard contact point in the area 21.

Figure 2:
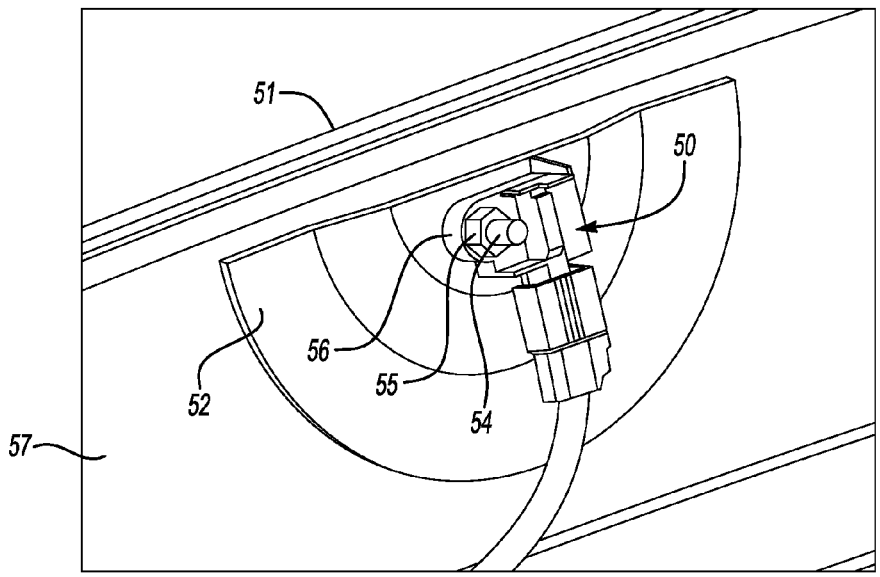
FIG. 2 is a perspective view of a sensor assembly mechanically fastened to a bumper cover via a stud, nut and bracket.

Now referring to FIG. 2, a sensor assembly 50 is attached to a vehicle fascia 51 as known in the art. Similar to sensor assembly 2, the sensor assembly 50 is mechanically attached to a bracket 52 via a stud 54, a nut 55 and a bushing 56. The bracket 52 is attached to a fascia B-surface 57 and the stud 54 extends toward a bumper beam (not shown). As with sensor assembly 2, a bracket, stud and nut combination such as bracket 52, stud 54 and nut 55 may influence a shorter and less desirable crush distance.

In addition to crush distance, a capability to detect a pedestrian at impact may be improved and/or increased when an impact sensor is at or near the leading edge of the vehicle, such as the vehicle's front or rear bumper cover (depending on the direction of vehicle movement). Typically, the leading edge of a vehicle comprises a fascia made up of a material which may be thin and include aesthetic design concerns. The aesthetic design concerns may limit and/or prevent usage of conventional fasteners which require piercing the front fascia, or fasteners which may deform the A-surface corresponding to the attachment location. The design constraints, performance requirements and aesthetic concerns mentioned above create multiple challenges for mounting sensors, such as pedestrian protection sensors, to a desired B-surface of a vehicle bumper cover and/or fascia.

FIG. 3 shows an illustrative sensor assembly 60 positioned on a bumper cover or fascia of an automotive vehicle. The sensor assembly 60 may include a sensor 62, a sensor housing 64 and a planar tab 66. Examples of a sensor 62 include but are not limited to acceleration sensors and/or pressure sensors. The tab 66 may be embedded into the sensor assembly 62 and may further be bonded to a fascia B-surface 68 of a fascia bumper cover 70. Two examples of bonding methods may include ultrasonic welding and adhesive bonding. The tab 66 may preferably have a thickness between one and three millimeters to facilitate a desired ultrasonic weld. An ultrasonic weld utilizing the tab 66 with a thickness above three millimeters may result in a dimple or other deformation to an A-surface 72 of the bumper cover 70. An ultrasonic weld utilizing the tab 66 with a thickness below one millimeter may not be strong enough to hold the sensor assembly 60 to the B-surface 68. The tab 66 may be, without limitation, a plastic strip or a material the same as a material used for the corresponding bumper cover. The distance between the B-surface 68 and sensor assembly 60 may be less than or equal to a desired tab 66 thickness. Additionally and/or optionally, the tab 66 may be an extension of the sensor housing 64.

As such and in contrast to the sensor assemblies in FIGS. 1 and 2, the sensor assembly 60 may be positioned substantially on the B-surface 68 without mechanical fasteners, such as a stud, thereby minimizing the fore-aft space occupied by the sensor assembly 60 and resulting in a greater crush distance shown as dimension 75. This configuration for sensor assembly 60 may further minimize the number of vehicle components and/or elements within an area 78. A preferred length for dimension 75 may be equal to or greater than seventy millimeters, though the length of dimension 75 may vary in accordance with the sensor assembly 60 thickness and tab 66 thickness. Each additional unit of measure added to the crush distance, in this case dimension 75, may provide additional pedestrian safety benefits. More space between the bumper beam 76 and an exemplary point of impact at the bumper cover 70 may provide, for example and without limitation, (i) more time for a vehicle safety system to receive, process and respond to a detection signal from sensor 60 following impact; and (ii) a larger cavity and/or space, such as area 78, to operate as a crumple zone to assist in reducing injury to the pedestrian following impact.

The sensor assembly 60 may further provide advantages with regard to operator assembly in a line and/or sub-assembly environment. Examples of bracket mounting methods at present may include snapping, adhering and welding to a vehicle fascia. Some sensors, such as parking aid sensors, may require a hole or holes in the fascia to attach the sensor bracket(s) either before or after the fascias are painted. Other sensors, such as those used in pedestrian sensing systems, may not require a hole through a fascia but may include multiple other steps for both assembly and attachment. The sensor assembly 60 may provide cost savings by reducing the number of operator steps involved in mounting sensor assemblies to vehicle bumper covers.

The sensor assembly 60 bonding location on the B-surface 68 may also influence performance of a pedestrian protection system. For example, a desired functionality of the sensor 62 may be to identify and/or determine a type of object at impact. Object characteristics, such as but not limited to density and weight, may vary between different types of objects and influence the effect of the impact. (A vehicle to tree collision, for example, may have a different impact effect on a vehicle than a vehicle to pedestrian collision.) A sensor system safety feature with a capability to identify and/or determine the type of object at impact and activate a response based on the determining may assist in reducing damage to the vehicle and/or object. The sensor system safety feature may determine that a density of an object at impact is below a predetermined threshold and as such, activate the vehicle response to reduce the vehicle force impacting the object.

For example, if a vehicle to pedestrian impact is at the bumper cover 70 of a vehicle and the system safety feature receives a detection signal from sensor 62 indicating the pedestrian has a density below or above a predetermined threshold, the safety feature may direct the vehicle's hood to "pop," or may direct deployment of an energy absorbing hood panel to reduce an amount of force transferred from the vehicle to the pedestrian. This effect is similar to a crumple-zone and may be increasingly effective with greater crush distances. It may therefore be advantageous to position the sensor 62 and/or sensor assembly 60 at or near a potential impact zone on a vehicle to promote detection upon impact.

FIGS. 4a through 7 show an illustrative sensor assembly 100 positioned on a bumper cover 102 for an automotive vehicle. The sensor assembly 100 may include a sensor 103 and a bracket 104 with a housing 105 and a base 106. An example of a sensor 103 may include an acceleration sensor or a park aid sensor as described above. In certain applications, pressure sensors may be another example of a sensor 103. A planar tab (not shown) may be embedded into the base 106 and may be bonded to a fascia B-surface 108 of the bumper cover 102. Two examples of bonding methods may include ultrasonic welding and adhesive bonding. The planar tab may preferably have a thickness between one and three millimeters to facilitate a desired ultrasonic weld. An ultrasonic weld of the planar tab with a thickness above three millimeters may result in a dimple or other deformation to an A-surface 107 of the bumper cover 102. An ultrasonic weld of the planar tab with a thickness below one millimeter may not be strong enough to hold the sensor assembly 100 to the B-surface 108. The planar tab may be, without limitation, a plastic strip or a material the same as a material used for the bumper cover 102. The distance between the B-surface 108 and sensor assembly 100 may be less than or equal to a desired planar tab thickness. Additionally and/or optionally, the planar tab may be an extension of the base 106.

Figure 4C:
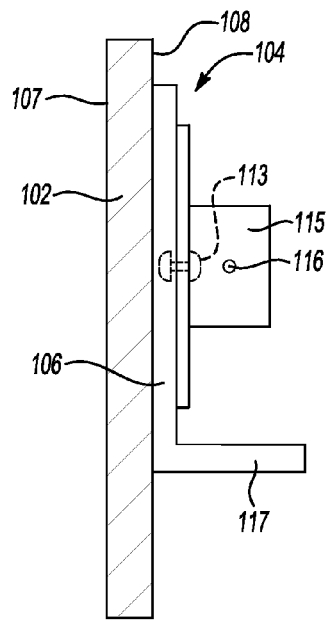
Figure 4D:
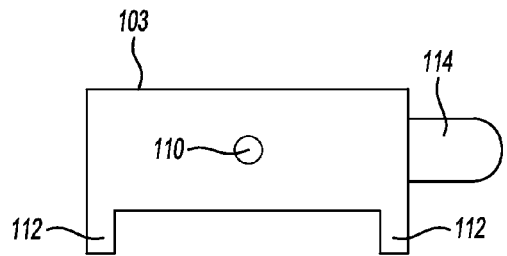

FIGS. 4a through 4c show the bracket 104 in a first position 118. The sensor 103 is shown prior to installation. The sensor 103 may include two extensions 110, two lock tabs 112 and a sensor connector 114. The bracket 104 may include a slot or slots 119 to receive the corresponding lock tabs 112. The sensor housing 105 may include two segments 115, each having an aperture 116 to receive the extensions 110 and facilitate attachment of the sensor 103 to the housing 105. A lock mechanism may include a pin 113 with a spring to bias the housing 105 toward the base 106. The bias may provide for controlled and/or selective rotation of the housing 105 when the sensor 103 is installed to the housing 105 as further described below. The housing may also include more than two segments 115.

Figure 4E:
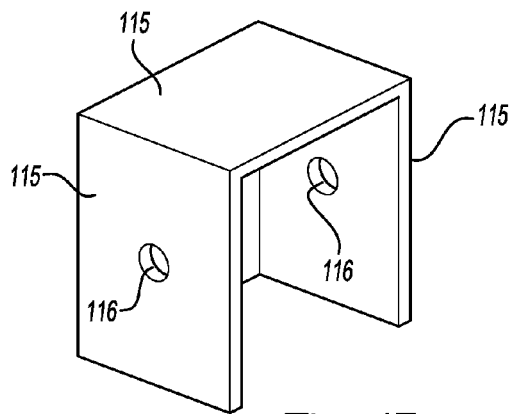
FIG. 4e is a perspective view of a housing for a bracket.

For example and now referring to FIG. 4e, three segments 115 may reduce a number of options available to a user for installing the sensor 103 to the housing 105. Three segments 115 may provide only one option for mounting the sensor 103 to the housing 105 so there is less opportunity for user error during installation/assembly operations. Further, the use of three segments 115 may prevent incorrect mounting altogether. Additional segments 115 may also increase structural integrity of the sensor assembly 100.

Figure 5A:
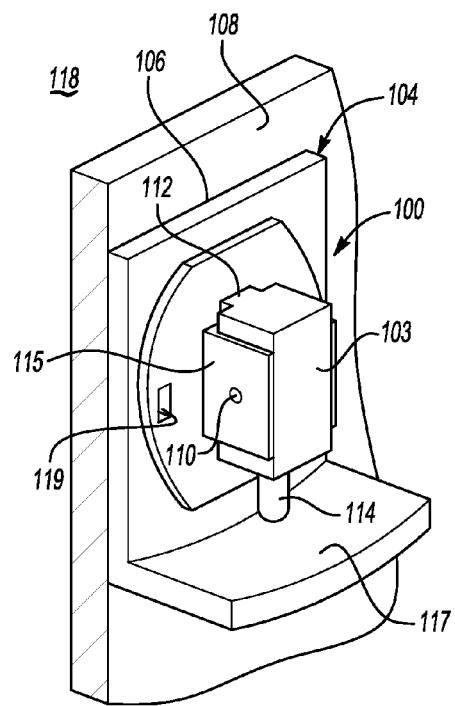

Referring now to FIG. 5a, the two segments 115 and apertures 116 may be configured such that the sensor 103 attaches to the housing 105 with the sensor connector 114 facing a wall 117. The wall 117 may include an arc-profile and may be positioned proximate to the sensor connector 114 to prevent mating access by another connector, such as a wire harness connector. Preventing mating access may be desirable if a concern exists with regard to proper installation of the sensor 103 to the housing 105. For example, the environment surrounding the sensor assembly 100 may be such that improper installation of the sensor assembly 103 interferes with a position designated for another component. Or improper installation may interfere with a subsequent operation in an assembly setting. The sensor 103 is shown installed to the housing 105 and in the first position 118 in FIG. 5a. While the first position 118 is shown in a vertical orientation, multiple orientations may be available.

Figure 5B:
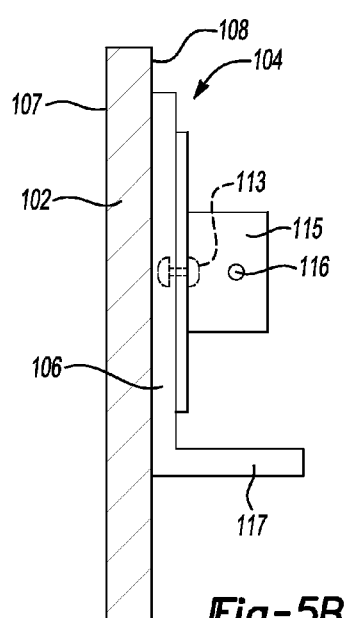
Figure 5C:
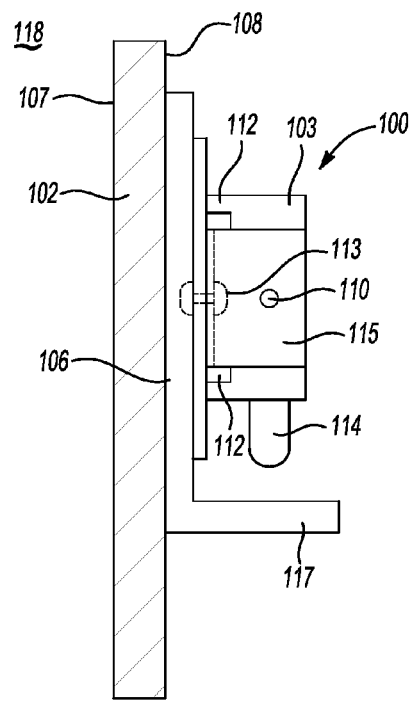
FIG. 5c is a side view of the bracket from FIG. 5a and a sensor installed onto the bracket.
Figure 6A:
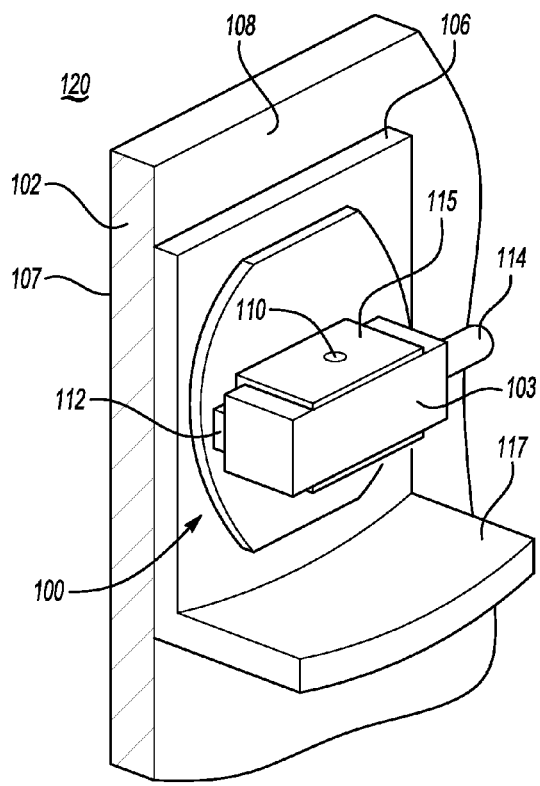
FIG. 6a is perspective view of the sensor assembly from FIG. 5a in a second position.
Figure 6B:
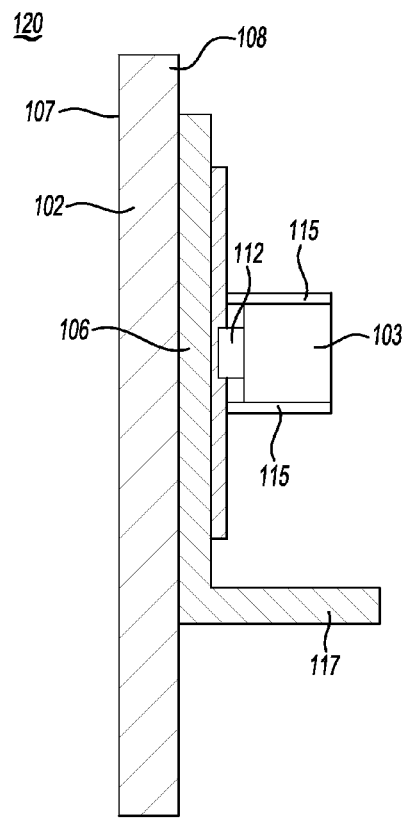

FIG. 5b shows a side view of the bracket 104 prior to installation of the sensor 103 to the housing 105. FIG. 5c shows a side view of the sensor 103 installed on the bracket 104. As the two extensions 110 mate with the apertures 116, the two lock tabs 112 act against the bias of the pin 113 to pull the housing 105 away from the base 106 to assist in facilitating rotation of the housing 105. For example, in FIGS. 6a and 6b the lock tabs 112 may extend from the sensor 103 for positioning within the slots 119. The location of the slots 119 may vary. The positioning of the slots 119, however, may preferably be such that the sensor connector 114 is accessible for mating in the second position 120. Rotating the housing 105 and sensor 103 to the second position 120 may align and mate the lock tabs 112 and slots 119. This mating in combination with biased pin 113 may hold the housing 105 and sensor 103 in the second position 120. Here, the sensor connector 114 is clear of the wall 117 to provide mating access by another connector such as a wire harness. FIGS. 6a and 6b show the second position 120 approximately 90 degrees from the first position 118, though alternative positioning relationships may be available.

Figure 7:
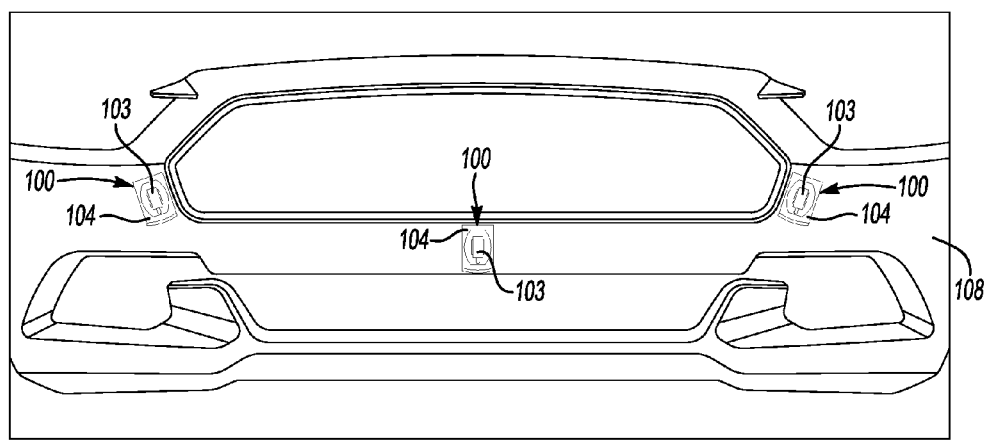
FIG. 7 is a rear view of three sensor assemblies attached to a bumper cover.

Further, utilizing multiple sensor assemblies 100 may also improve and/or increase the capability to detect an object at impact. FIG. 7 shows an illustrative configuration for a group of sensor assemblies 100. Each sensor assembly 100 may be positioned in an area and/or zone on a vehicle fascia where an impact is most likely to occur and/or most often occurs. A corresponding number of wire harnesses may connect to the sensors 102 when in the second position 120 to receive information obtained by the sensors 102. This information may then be transmitted to, for example, a controller.

FIGS. 8a through 10b show another illustrative sensor assembly 200 positioned on a bumper cover 202 for a bumper beam of an automotive vehicle. The sensor assembly 200 may include a sensor 203 and a bracket 204. An example of the sensor 203 may include an acceleration sensor or a park aid sensor as described above. In certain applications, pressure sensors may be another example of the sensor 203. The bracket may define a key hole 205 and a base 206. A planar tab (not shown) may be embedded into the base 206 and may be bonded to a fascia B-surface 208 of the bumper cover 202. Two examples of bonding methods may include ultrasonic welding and adhesive bonding. The planar tab may preferably have a thickness between one and three millimeters to facilitate a desired ultrasonic weld. An ultrasonic weld of the planar tab with a thickness above three millimeters may result in a dimple or other deformation to an A-surface 207 of the bumper cover 202. An ultrasonic weld of the planar tab with a thickness below one millimeter may not be strong enough to hold the sensor assembly 200 to the B-surface 208. The planar tab may be, without limitation, a plastic strip or a material the same as a material used for the bumper cover 202. The distance between the B-surface 208 and sensor assembly 200 may be less than or equal to a desired planar tab thickness. Additionally and/or optionally, the planar tab may be an extension of the base 206.

Figure 8A:
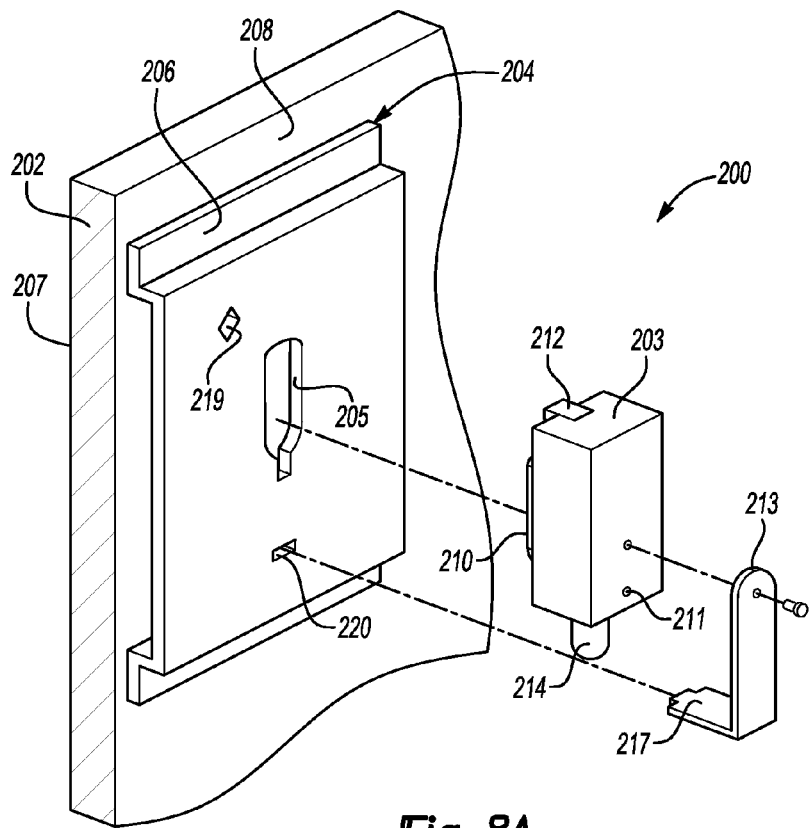
FIG. 8a is a perspective view of a sensor assembly.
Figure 8C:
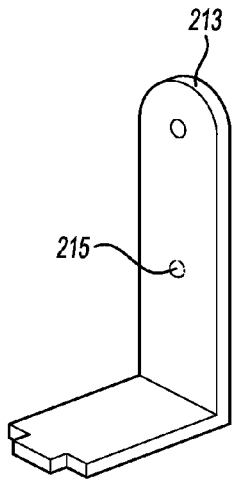
Figure 8B:
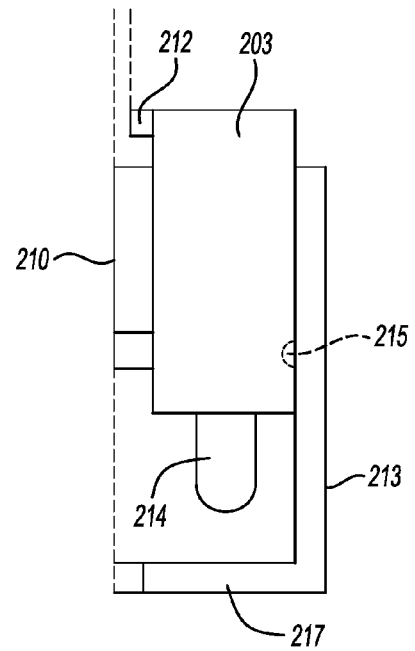

Now referring to FIGS. 8a through 8c, the sensor 203 may include a key 210, one or more apertures 211, a lock tab 212, a prevention clip 213, and a sensor connector 214. The key 210 may extend from the sensor 203 and be configured to mate with the key hole 205 further described below. The prevention clip 213 may selectively rotate and include one or more nubs 215 and an arm 217. The arm 217 may be referred to as an extension or wall. The bracket 204 may define a tab slot 219 to receive the corresponding lock tab 212 and may define an arm slot 220 to receive a portion of the arm 217. The aperture(s) 211 may be defined by the sensor and may receive nub(s) 215 to hold the prevention clip 213 in a position proximate with the connector 214 such that the arm 217 may prevent access to the connector 214. Applying an appropriate rotational force to the sensor 203 and prevention clip 213 may disengage the nub(s) 215 from the aperture(s) 211.

Figure 9A:
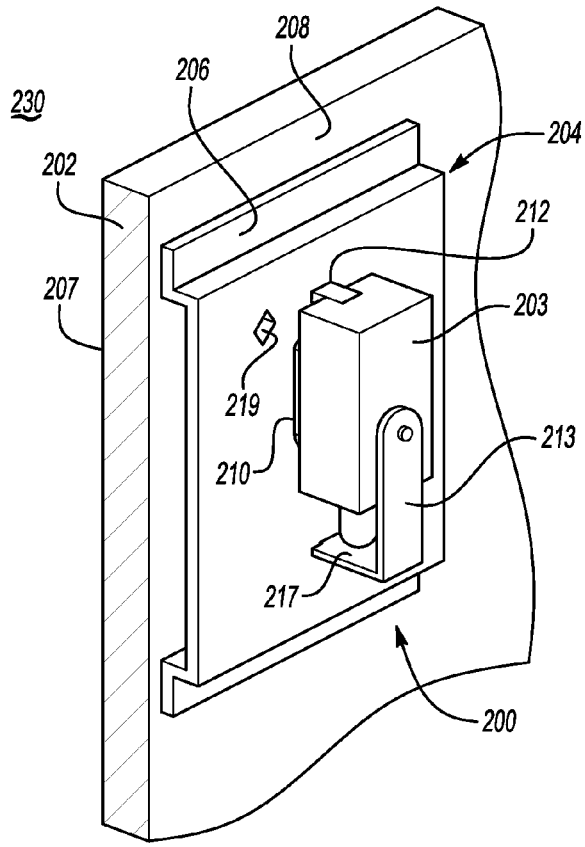
FIG. 9a is a perspective view of a sensor assembly in a first position.
Figure 9B:
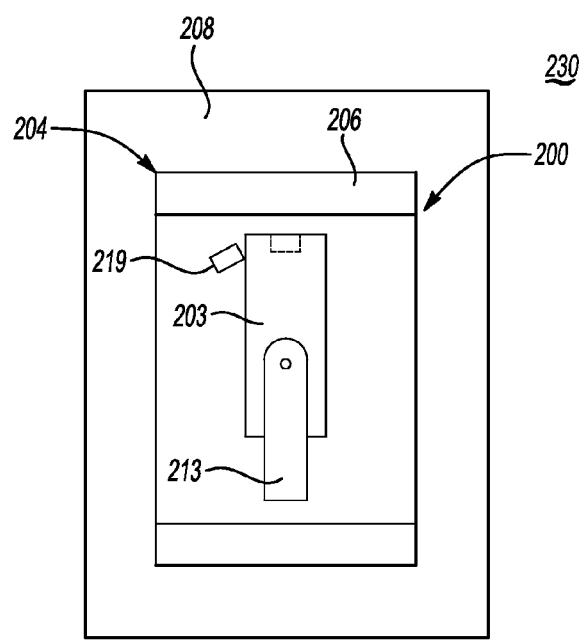
FIG. 9b is a front view of FIG. 9b.

Referring now to FIGS. 9a and 9b, the sensor 203 may be in a first position 230 in which the key 210 is partially inserted into the key hole 205 and the arm 217 is partially inserted into the arm slot 220. As described above, the arm 217 may prevent mating access to the connector 214 by another connector, such as a wire harness connector. Preventing mating access may be desirable if a concern exists with regard to proper installation of the sensor 203 to the bracket 204. For example, the environment surrounding the sensor assembly 200 may be such that improper installation of the sensor assembly 200 interferes with a position designated for another component. Or, improper installation may interfere with a subsequent operation in an assembly setting. The sensor 203 is shown installed to the bracket 204 and in the first position 230 in FIG. 9a. While the first position 230 is shown in a vertical orientation, multiple orientations may be available.

Figure 10A:
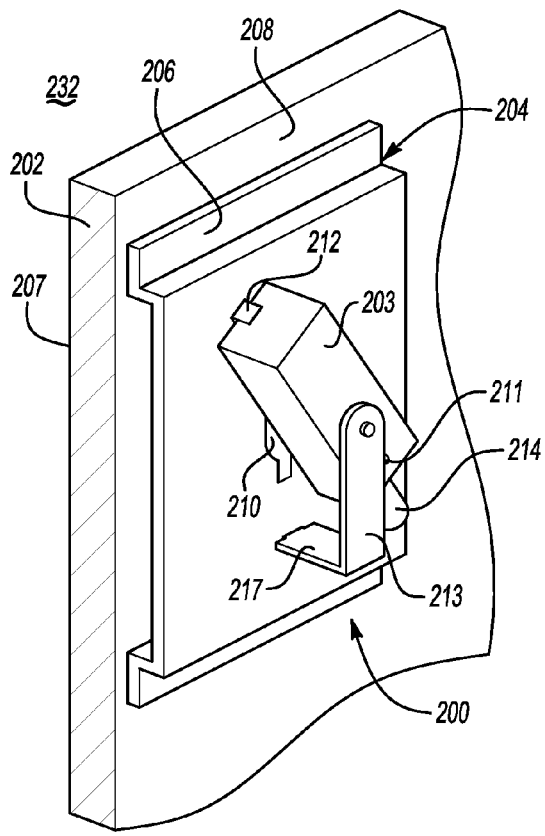
FIG. 10a is a perspective view of a sensor assembly in a second position.
Figure 10B:
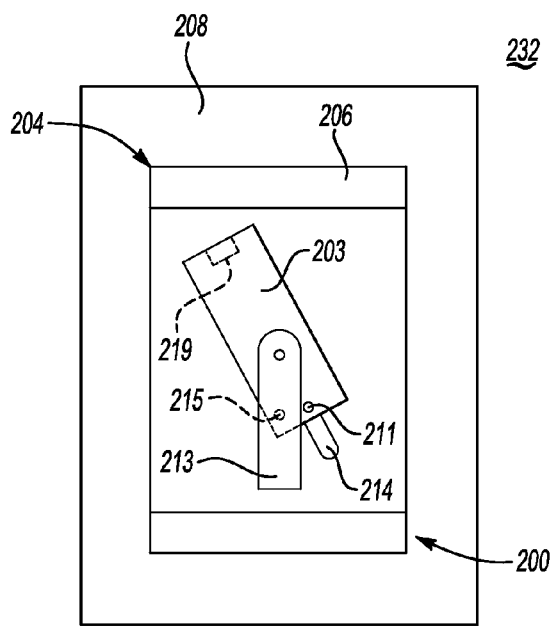

Once the rotational force has been applied to the sensor 203 and prevention clip 213 to disengage the nub 215, the sensor 203 may rotate to a second position 232. For example and now referring to FIGS. 10a and 10b, rotating the sensor 203 may direct the nub 215 to disengage from the aperture 211 while the arm 217 may remain in the arm slot 220. The key 210 and key hole 205 may be in registration such that the key 210 may fully mate with the key hole 205 in the second position 232. In this example, the key 210 may be rotatably attached to the sensor 203 to facilitate sensor rotation between the first position 230 and the second position 232. When aligned, the lock tab 212 may mate with the tab slot 219, and the key 210 and arm 217 may fully insert and mate with the key hole 205 and arm slot 220, respectively. The location of the tab slot 219 may vary. The positioning of the slot 219, however, may preferably be such that the sensor connector 214 is accessible for mating in the second position 232. Here, the sensor connector 214 is clear of the arm 217 to provide access by another connector such as a wire harness. FIGS. 10a and 10b show the second position 232 approximately 30 degrees from the first position 230, though alternative positioning relationships may be available. As such, the lock tab 212, arm 217 and key 210 may hold the sensor 203 in the second position by mating with the tab slot 219, arm slot 220 and key hole 205, respectively.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a bumper beam;
   a bumper cover having inner and outer surfaces; and
   an impact sensor assembly attached to, without mechanically fastening, the inner surface and including a housing, an acceleration sensor disposed within the housing, and a planar tab ultrasonically welded to the inner surface, wherein the planar tab is located between the acceleration sensor and bumper cover and has a thickness such that when ultrasonically welded to the inner surface, the planar tab does not deform the outer surface proximate to the planar tab, wherein the housing is spaced away from the inner surface a distance no greater than the thickness of the planar tab, and wherein the assembly is arranged such that the distance between the bumper beam and the assembly is at least seventy millimeters.

2. The vehicle of claim 1, wherein the sensor assembly further includes a wall, wherein the housing is configured to selectively rotate between first and second positions, wherein the wall prevents mating access of a wire harness connector to a sensor connector when the housing is in the first position, and wherein the sensor is accessible for mating when the housing is in the second position.

3. The vehicle of claim 2, wherein the sensor assembly further includes a lock mechanism configured to hold the housing in the first position and release the housing in response to the acceleration sensor being attached to the housing.

4. The vehicle of claim 2, wherein the sensor assembly defines a slot and wherein the acceleration sensor includes a lock tab configured to mate with the slot when the housing is in the second position.

5. The vehicle of claim 2, wherein the sensor assembly further includes a pin with a bias configured to selectively hold the housing in the first position until the acceleration sensor is attached thereto.

6. The vehicle of claim 2, wherein a material of the planar tab is the same as a material of the bumper cover.

7. The vehicle of claim 2, wherein a thickness of the planar tab is between one and three millimeters.

8. A fascia assembly comprising:
   a bumper beam;
   a bumper cover including an inner surface; and
   a sensor assembly disposed between the beam and cover and including a planar tab bonded to the inner surface, a housing configured to rotate between first and second positions, a sensor connector, and a wall proximate to the connector and configured to prevent mating access thereto when the housing is in the first position but not in the second position.

9. The fascia assembly of claim 8, further comprising a pin configured to bias the housing toward the bumper cover to selectively hold the housing in the first position until a sensor is attached thereto.

10. The fascia assembly of claim 9, wherein the sensor assembly further includes a sensor associated with the sensor connector and including a lock tab configured to space the housing away from the bumper cover to permit rotation of the housing and sensor from the first position to the second position.

11. The fascia assembly of claim 10, wherein the sensor assembly defines a slot configured to mate with the lock tab.

12. The fascia assembly of claim 8, wherein the planar tab is embedded within the housing.

13. The fascia assembly of claim 8, wherein a thickness of the planar tab is between one and three millimeters.

14. A vehicle comprising:
    a bumper beam;
    a bumper cover including an inner surface;
    a bracket disposed between the bumper beam and bumper cover, the bracket defining a base bonded to the inner surface and a housing configured to rotate between first and second positions;
    a sensor including a connector and configured to attach to the housing; and
    a lock mechanism configured to hold the housing in the first position and to release the housing in response to the sensor being attached to the housing, wherein the bracket includes a wall configured to prevent mating access to the connector when the housing is in the first position but not in the second position.

15. The vehicle of claim 14, wherein the bracket and sensor are arranged such that a minimum distance between the bumper beam and the sensor is at least seventy millimeters.

16. The vehicle of claim 14, wherein the bracket further defines a slot and wherein the sensor further includes a lock tab configured to mate with the slot when the housing is in the second position.

17. The vehicle of claim 14, wherein the bracket further comprises a biased pin configured to selectively hold the housing in the first position until the sensor is attached thereto.

18. The vehicle of claim 14, wherein the bracket further defines a planar tab ultrasonically welded to the inner surface.

19. The vehicle of claim 18, wherein a thickness of the planar tab is between one and three millimeters.

20. The vehicle of claim 18, wherein a material of the planar tab is the same as a material of the bumper cover.

* * * * *